United States Patent [19]

Koishi et al.

[11] Patent Number: 5,726,830
[45] Date of Patent: Mar. 10, 1998

[54] AIR-BEARING ELECTROMAGNETIC HEAD SLIDER HAVING NEGATIVE PRESSURE GENERATING MEANS

[75] Inventors: Ryosuke Koishi; Seiji Yoneoka; Yoshifumi Mizoshita, all of Kawasaki, Japan

[73] Assignee: Fujitsu Limited, Kawasaki, Japan

[21] Appl. No.: 558,782

[22] Filed: Nov. 16, 1995

[30] Foreign Application Priority Data

Apr. 7, 1995 [JP] Japan .................. 7-082719

[51] Int. Cl.⁶ .................................................. G11B 5/60
[52] U.S. Cl. ................................................... 360/103
[58] Field of Search ...................................... 360/103

[56] References Cited

U.S. PATENT DOCUMENTS

| | | | |
|---|---|---|---|
| 5,019,930 | 5/1991 | Takeya | 360/103 |
| 5,091,810 | 2/1992 | Kakizaki et al. | 360/103 |
| 5,309,303 | 5/1994 | Hsia et al. | 360/103 |
| 5,317,465 | 5/1994 | Chapin et al. | 360/103 |
| 5,353,180 | 10/1994 | Murray | 360/103 |
| 5,406,432 | 4/1995 | Murray | 360/103 |
| 5,490,025 | 2/1996 | Dorius et al. | 360/103 |
| 5,499,149 | 3/1996 | Dovek | 360/103 |

FOREIGN PATENT DOCUMENTS

| | | | |
|---|---|---|---|
| 53-5612 | 1/1978 | Japan | 360/103 |
| 59-72679 | 4/1984 | Japan | 360/103 |
| 61-170922 | 8/1986 | Japan | 360/103 |
| 2-49280 | 2/1990 | Japan | 360/103 |
| 2246067 | 10/1990 | Japan . | |
| 417176 | 1/1992 | Japan . | |
| 4-271073 | 9/1992 | Japan | 360/103 |
| 4298872 | 10/1992 | Japan . | |
| 4-325975 | 11/1992 | Japan | 360/103 |
| 4362582 | 12/1992 | Japan . | |
| 5151735 | 6/1993 | Japan . | |
| 6-150601 | 5/1994 | Japan | 360/103 |
| 6203515 | 7/1994 | Japan . | |

*Primary Examiner*—A. J. Heinz
*Assistant Examiner*—Brian E. Miller
*Attorney, Agent, or Firm*—Greer, Burns & Crain, Ltd.

[57] ABSTRACT

An air-bearing head slider supports an electromagnetic transducer opposed to a rotating recording medium or magnetic disk. The slider includes a slider body having a bottom surface opposed to the rotating magnetic disk, the bottom surface having an air-entry end and an air-delivery end with respect to an air flow generated between the slider body and the rotating recording medium. A central rail is provided on the surface of the slider body at the air-entry end. The central rail extends from the air-entry end and terminates on its way to the air-delivery end. Two side rails are provided on the surface of the slider body at the air-delivery side and extend from the air-delivery end and terminate on their way to the air-entry end. An air flow passage, extending from the air-entry end to the air-delivery end, includes air gaps defined between the central rail and the two side rails and an area on the bottom surface located downstream of the gaps, so that a negative pressure is generated in the downstream area due to the air flow passing through the gaps.

8 Claims, 4 Drawing Sheets

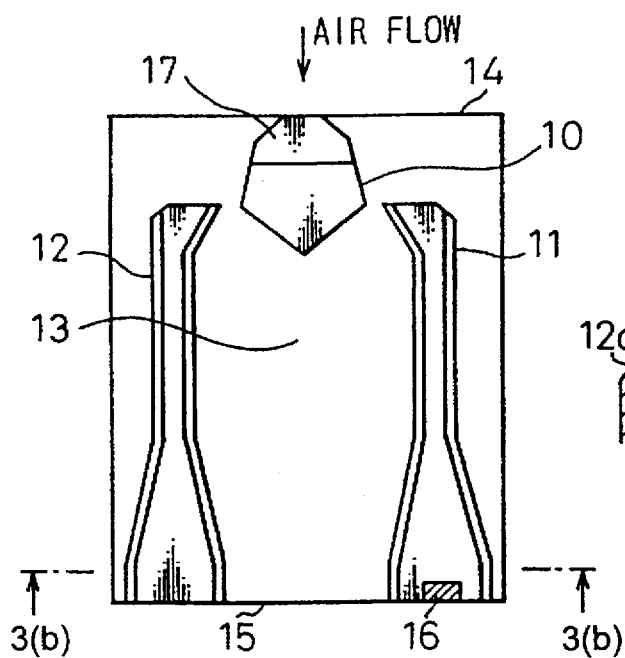
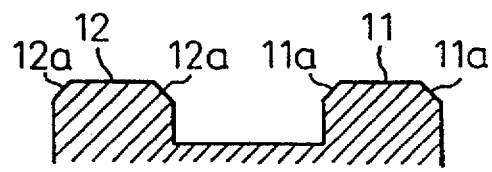
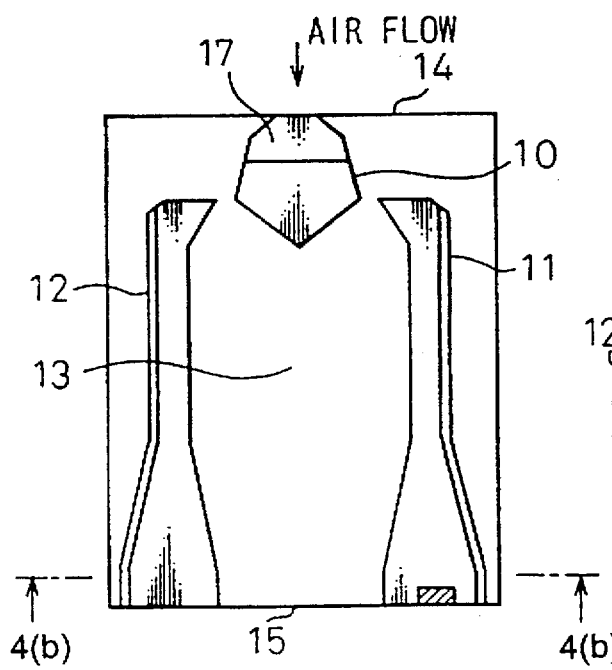
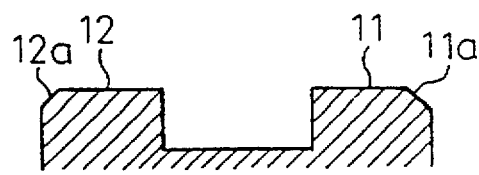

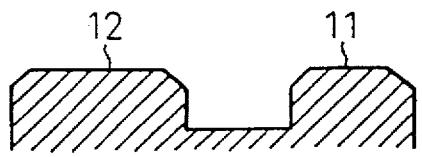
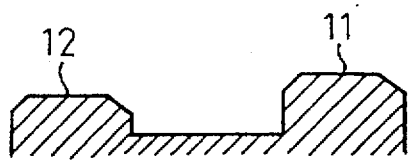
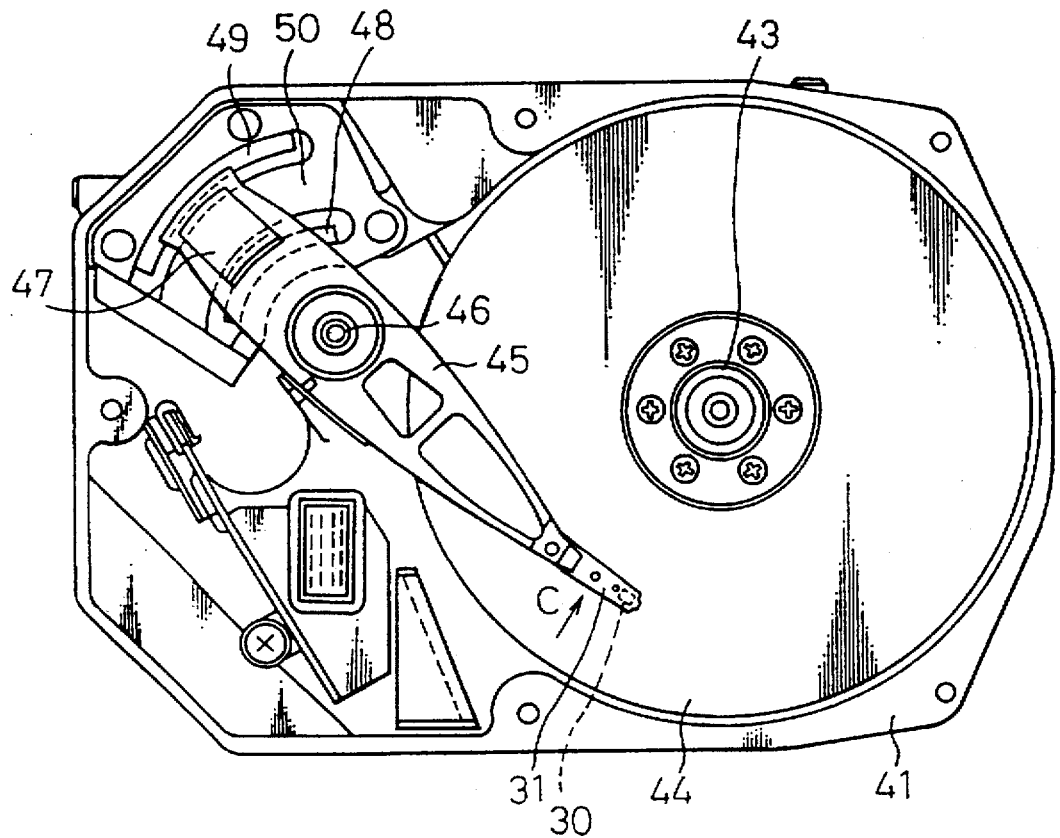
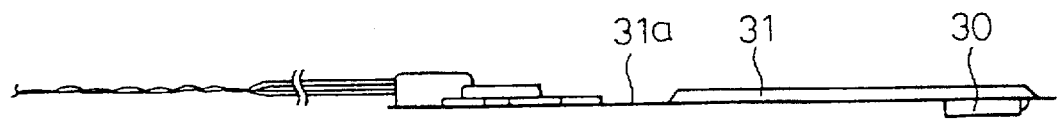

AIR-BEARING ELECTROMAGNETIC HEAD SLIDER HAVING NEGATIVE PRESSURE GENERATING MEANS

BACKGROUND OF THE INVENTION

1. Field of the Invention

This invention relates to an air-bearing head slider of an electromagnetic transducer in which at least two rails for generating a flying or floating force are provided on a surface opposed to a magnetic recording medium in the direction of an air flow generated by the rotation of the magnetic recording medium.

Recently, there is a demand for downsizing electromagnetic disk units. In the case of an air-bearing electromagnetic head slider, the floating height has been reduced so as to accomplish high density recording. When the floating height of the electromagnetic head slider is reduced, it becomes necessary to stabilize the floating height. Recently, an electromagnetic head slider having a floating height of not more than 0.05 μm has been studied and developed.

2. Description of the Related Art

At present, the most widely used electromagnetic head slider is the one referred to as a "Guppy" type, in which two rails are provided. In such a negative pressure type electromagnetic head slider having two rails, in order to improve the floating stability, the width of these rails is gradually increased from the air- entry side to the air-delivery side thereof to generate a negative pressure in the area defined between these two rails (see Unexamined Patent Publication (Kokai) No. 2-184082). Also, an approach has been made to restrict a change of the floating force on the slider by reducing the width of the rails at their air-entry side. In this case, since an air-suction force is generated by changing only the width of the rails, it will be easy to manufacture such sliders.

Other prior art regarding an electromagnetic head slider will now be described as follows.

Unexamined Patent Publication (Kokai) No. 4-17176 discloses an electromagnetic head slider having one rail at the center of the air-entry side and two rails at the air-delivery side. However, in this approach, since there is no mechanism for generating a negative pressure, the slider will be a positive pressure slider. Therefore, it is difficult to restrict the floating force. On the other hand, the area of rails are reduced, but the pressure exerted on the electromagnetic medium becomes higher. Thus, the reliability thereof will be reduced.

Unexamined Patent Publication (Kokai) No. 4-298872 discloses an electromagnetic head slider having two rails at the air-entry side and one rail at the center of the air-delivery side. However, a recess is provided in the non-rail portion to define a negative pressure generating area and, therefore, a force for generating negative pressure is too weak to sufficiently restrict the slider floating force. On the other hand, since there is only one rail at the air-delivery side, the slider has low rigidity in the direction of the movement of the electromagnetic medium and lacks stability in the direction of rolling.

Unexamined Patent Publication (Kokai) No. 6-203515 discloses an electromagnetic head slider also having two rails at the air-entry side and one rail at the center of the air-delivery side. In this prior art, in the same manner as JPP'4-298872, there is a problem that the slider lacks stability in the direction of rolling. Unexamined Patent Publication (Kokai) No. 4-362582 discloses an electromagnetic head slider having substantially the same structure as mentioned above and involves the same problems.

In an electromagnetic head slider, in order to further improve the recording density, it is required to further reduce the head floating distance to not more than 0.03 μm, i.e., substantially zero sliding height. Namely, in such a flying height range, it is considered that the electromagnetic head slider floating on the recording medium is always in contact with any possible convexities existing thereon ("substantially in-contact condition"). Thus, such an electromagnetic head slider is required to have the necessary durability in a substantially in-contact condition and a flying or floating stability for the purpose of improving the stability.

SUMMARY OF THE INVENTION

An object of the present invention is to provide an electromagnetic head slider in which an amount of head floating with respect to the recording medium can be further reduced in response to the improvement of a recording density in the recording medium and stability can be obtained when the floating or sliding operation of the slider is performed.

According to the present invention, there is provided an air-bearing electromagnetic head slider for supporting an electromagnetic transducer opposed to a rotating recording medium or magnetic disk, the slider comprising: a slider body having a bottom surface opposed to the rotating magnetic disk, the bottom surface having a leading or air-entry end and a trailing or air-delivery end with respect to an air flow generated between the slider body and the rotating recording medium; at least one first rail provided on the surface of the slider body at the air-entry end, the first rail extending from the air-entry end and terminating on its way to the air-delivery end; at least two second rails provided on the surface of the slider body at the air-delivery end, the second rails extending from the air-delivery end and terminating on their way to the air-entry end; and an air flow passage, extending from the air-entry end to the air-delivery end, including air gaps defined between the first rail and the second rails, and a downstream area on the bottom surface located downstream of the gaps, so that a negative pressure is generated in the downstream area due to air flows passing through the gaps.

In an embodiment of this invention, at least one first rail comprises a single rail located at a central position adjacent the air-entry end and relatively short with respect to a direction of air flow; the at least two second rails comprise two rails located at the respective sides of the first rail and relatively long in the direction of air flow; and the downstream area on the bottom surface being defined between the two second rails, so that a negative pressure is generated in the downstream area due to air flows passing through the gaps defined between the single first rail and the two second rails, respectively.

In a still another embodiment, the two second rails are substantially parallel to each other and the width of each second rail is gradually enlarged in the vicinity of the air-delivery end.

In a further embodiment, the first rail is provided with a tapered portion adjacent the air-entry end for removing dust.

Each of the second rails may be provided at an outside edge of the slider body with a chamfered portion along a direction of air flow.

Each of the second rails may be provided at the inside and outside edges thereof with respective chamfered portions, along a direction of air flow.

In one embodiment, at least one of the at least two second rails is provided at an air-delivery end thereof with an electromagnetic transducer, and the second rail provided with the electromagnetic transducer is constructed in such a manner that a floating height of the one second rail, at the air-delivery end thereof, with respect to the rotating magnetic disk, is always smaller than a floating height of the other second rail, at the air-delivery end thereof.

In a still another embodiment of this invention, the at least two second rails comprise two rails located at respective sides of the first rail and relatively long in the direction of air flow; and a width or area of one of the second rails is different from a width or area of the other second rail, so that the slider body is subjected to a rolling function with respect to a direction of movement of the electromagnetic transducer, in such a manner that a floating height of the one second rail, at the air-delivery end thereof, with respect to the rotating magnetic disk, is always smaller than a floating height of the other second rail, at the air-delivery end thereof.

In a still further embodiment of this invention, the at least two second rails comprise two rails located at the respective sides of the first rail and relatively long in the direction of air flow; and a height of one of the second rails is different from a height of the other second rail, so that a floating height of the one second rail, at the air-delivery end thereof, with respect to the rotating magnetic disk, is always smaller than a floating height of the other second rail, at the air-delivery end thereof.

BRIEF DESCRIPTION OF THE DRAWINGS

FIG. 3(a) is a plan view of an embodiment of an electromagnetic head slider of this invention, as seen from a floating surface opposed to a recording medium; and FIG. 3(b) is a cross-sectional view taken along line 3(b)—3(b);

FIG. 4(a) is a plan view of another embodiment of an electromagnetic head slider of this invention, as seen from a floating surface opposed to a recording medium; and FIG. 4(b) is a cross-sectional view taken along line 4(b)—4(b);

FIGS. 5(a) and 5(b) are respective cross-sectional views taken along line A—A in FIG. 3(a) for illustrating the respective embodiments of an electromagnetic head slider;

FIG. 6 is a plan view of an electromagnetic disk apparatus in which an electromagnetic head slider of this invention can advantageously be used; and FIG. 7 is an enlarged side view seen from an arrow C in FIG. 6 and illustrating a head slider and its suspension in the electromagnetic disk apparatus.

DESCRIPTION OF THE PREFERRED EMBODIMENTS

Figure 1A:
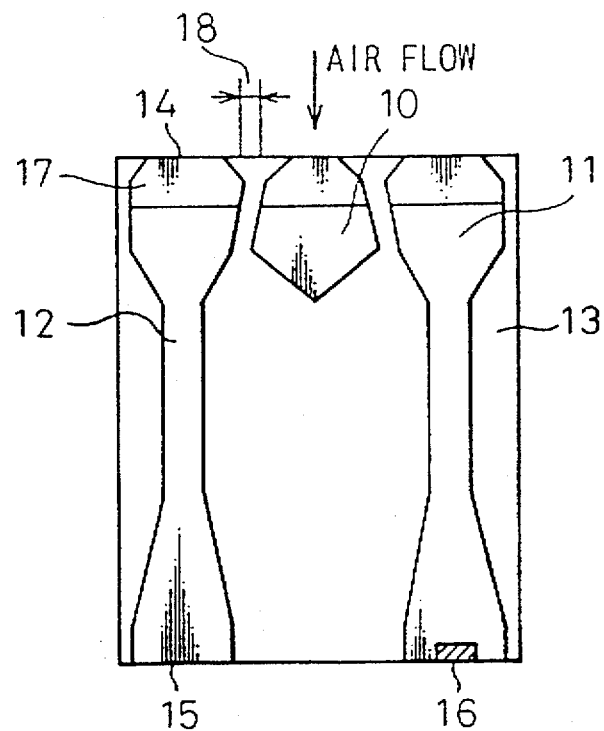
FIGS. 1(a) and 1(b) are plan and perspective views of an electromagnetic head slider conventionally known in the prior art, as seen from a floating surface opposed to a recording medium.
Figure 1B:
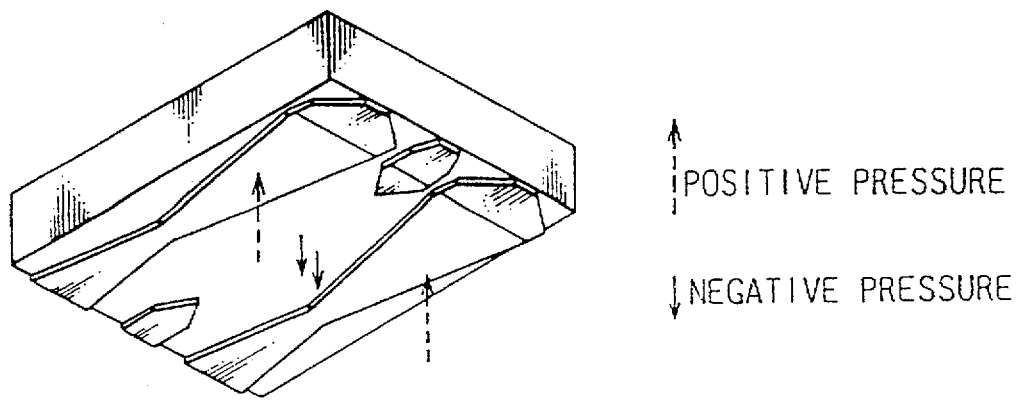

Before describing particular embodiments of this invention, a conventionally known negative pressure type electromagnetic head slider will now be described with reference to FIGS. 1(a) and 1(b). The electromagnetic head slider comprises rails 10, 11 and 12; recesses 13; an air-entry end 14; an air-delivery end 15; an electromagnetic transducer element 16; tapered portions 17 at the air-entry ends; and slits (gaps) 18.

The electromagnetic head slider of the prior art has the single central rail 10 at the air-entry end 14 as well as two rails 11 and 12 arranged at the respective sides of the slider. The width of these two side rails 11 and 12 is increased in the vicinity of the air-delivery end 15 to restrict a change of floating due to a change of the yoke angle.

Figure 2:
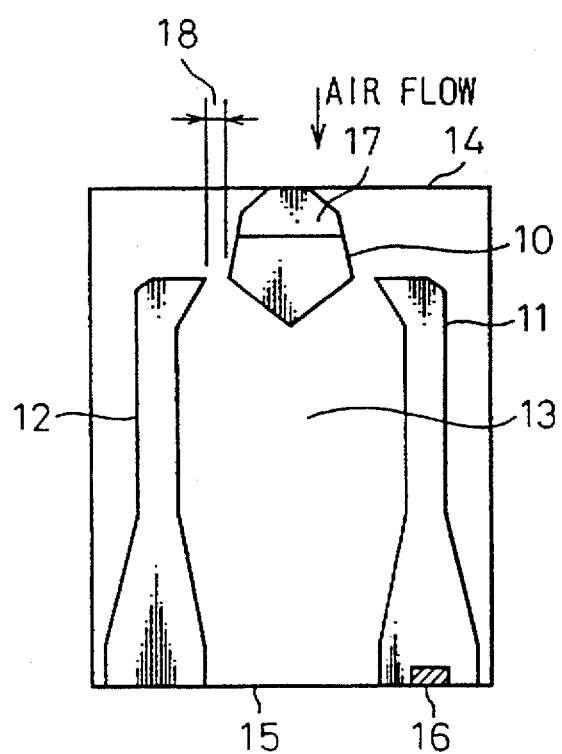
FIG. 2 is a plan view of an electromagnetic head slider according to the present invention, as seen from a floating surface opposed to a recording medium.

FIG. 2 is a plan view of an electromagnetic head slider according to the present invention, as seen from a floating surface opposed to a recording medium (not shown in FIG. 2). This electromagnetic head slider comprises rails 10, 11 and 12; recess 13; an air-entry end 14; an air-delivery end 15; an electromagnetic transducer element 16; dust removing tapered portions 17 of the rails 10, 11 and 12 at the air-entry ends; and slits (or gaps) 18.

The material of the slider body is alumina-titan-carbide ($Al_2O_3$—TiC). Such a slider body can be made as follows. First, a wafer (not shown) provided with a plurality of electromagnetic transducer elements 16 is cut into individual sliders, each having a size as shown in FIG. 2. Then, side walls of the slider including air-entry and air-delivery end walls are formed and rails 10, 11 and 12 are also formed on the lower surface of the slider, i.e., the surface opposite to the electromagnetic recording medium. In an example, the slider has a relatively small size, such as a size of (length and width) 2 mm×1.6 mm or 1.25 mm×1.0 mm and a height of 0.3 mm. Also, the width of the rails 11 and 12 is in the order of several μm at the minimum. Therefore, such a fine machining processing can be carried out using a photolithography technique. That is to say, a particular shape of rail patterns is first formed by coating a photoresist and then the recesses (i.e., the portions other than the rails 10, 11 and 12) are formed by ion-milling. The depth of the recesses is about 2 to 3 μm. The tapered portion 17 of the first rail 10 at the center of the air-entry end is formed by mechanical processing before or after the surface of rails are formed. The angle of this dust removing tapered portion 17 is 0.5° to 1.5°, the thickness thereof becomes smaller toward the air-entry end. The length of the tapered portion 17 in the air flow direction is 1/10 to 1/20 of the total length of the slider. The first rail 10 is extended from the air-entry end 14 toward the air-delivery end 15, but terminates at a position about ¼ of the distance from the air-entry end 14.

On the other hand, the two second rails 11 and 12 are arranged at left and right sides and extend from the air delivery end 15, but do not reach to the air-entry end 14 and terminate at positions adjacent the first rail 15 to define slits or gaps 18 between the first rail 10 and the second rails 11 and 12. The width of the second rails 11 and 12 is gradually increased adjacent the air delivery end 15. The electromagnetic transducer element 16 is mounted on one of the second rails 11 and 12 (usually, the outer rail with respect to the disk-like electromagnetic recording medium) at the air delivery end 15 thereof.

As mentioned above, since there is the first rail 10 which is provided at the center of the air-entry end 14 and does not extend to the air-delivery end 15, the pressure owing to the air flow in the direction indicated by an arrow caused by the rotation of the electromagnetic recording medium (not shown) can be reduced and thus a pitching motion, i.e., a swinging motion in the forward and rearward direction, is reduced. Therefore, the rigidity of the slider during a seeking operation is increased and floating stability is improved. Also, since there are two second rails 11 and 12 provided at the left and right sides of the slider, a negative pressure is generated due to the air flow flowing through the gaps (slits) 18 into the recess 13 at the downstream side of the slider. Thus, such a negative pressure is exerted to the slider, particularly at the air-delivery side thereof, so that an amount of flow is restricted to not more than 0.3 g and stability in the direction of rolling and weight reduction of the slider can be attainted.

FIGS. 3(a) and 3(b) show a second embodiment of an electromagnetic head slider of this invention and FIGS. 4(a) and 4(b) show a third embodiment of an electromagnetic head slider of this invention. In these embodiments, the second rails 11 and 12 are provided at the inside and outside edges (only the outside edges in the third embodiment shown in FIGS. 4(a) and 4(b)), with chamfered or tapered portions 11a and 12a along the air flow direction. Since the second rails 11 and 12 are provided with such chamfered or tapered portions 11a and 12a, a pressure is generated in the direction of movement of the recording medium during a seeking operation (due to a rolling operation in the slider), so that an amount of floating of the rails 11 and 12 is increased and therefore a stable seeking operation can be attained. In addition, since the chamfered or tapered portions are provided only on the outside of these rails, the floating height of the rails 11 and 12 can further be increased during a seeking operation.

FIGS. 5(a) and 5(b) show modified embodiments of FIG. 3(a), i.e., cross-sections taken along a line 3(b)—3(b) in FIG. 3(a). Thus, the second rails 11 and 12 may thus be modified as shown by the cross-sections of FIGS. 5(a) and 5(b). The spacing with respect to the electromagnetic recording medium for only one (11) of the rails 11 and 12, on which the electromagnetic transducer element 16 is mounted, is limited by always increasing the floating height of the other rail 12. Thus, a possibility of contact between the element 16 and the recording medium is substantially reduced and therefore the stability of the slider is improved. In this case, if a negative pressure type or substantially contact type slider is used, stability of the slider can further be increased.

The other ways to change the floating height of the left and right rails from each other area are as follows. The width or area of the rail 11, on which the electromagnetic transducer element 16 is mounted, is reduced so that a rolling motion causes an increase in the floating height of the opposite rail 12 (see FIG. 5(a)), or the thickness of the rail 12, on which no element 16 is mounted, is reduced so as to increase the height of floating of the rail 2 without a rolling motion.

In FIG. 7, the electromagnetic head slider 30 constructed as mentioned above is swingingly mounted on a holder portion formed at an end of a gimbal spring 31, which has a base end portion provided with a flexible portion 31a. The spring 31 is also provided at the respective sides thereof with flanges at an intermediate portion to increase the rigidity thereof.

The base end of the gimbal spring 31, on which the electromagnetic head slider 30 is mounted, is connected to a head arm of the electromagnetic disk apparatus. FIG. 6 shows an example of an electromagnetic disk apparatus in which an electromagnetic head slider of this invention can be used. In FIG. 6, however, an upper cover of the disk enclosure is omitted for the sake of simplicity. The disk enclosure 41 shown in FIG. 6 has a base in which a spindle 43 is rotatably supported. The spindle 43 is rotated by a spindle motor (not shown). A plurality of electromagnetic recording disks 44 are attached to the spindle 43 at certain intervals. A head arm 45 is rotatably supported on a shaft 46 of the base of the enclosure 41. One end of the head arm 45 is provided with a coil 47 and the other end thereof is provided with a gimball spring 31 on which an electromagnetic head slider 30 according to the present invention is mounted. Thus, the coil 47 is provided in a gap of a magnetic circuit formed by magnets 48 and 49 and a yoke 50.

The electromagnetic head slider 30 is mounted on the head arm 45 in such a manner that the electromagnetic recording disk 44 is pushed by the electromagnetic head slider 30 with a certain spring pressure. Thus, in this case the disk apparatus employs a CSS system (a contact start and stop system). When the electromagnetic recording disk 44 is rotated, the air flows through the electromagnetic head slider 30 and a floating force is generated on the floating surfaces of the rails 10, 11 and 12 to move the slider 30 away from the electromagnetic disk 44. At the same time, an inlet air flow is expanded in the recesses 13 of the slider 30 and thus a negative pressure is generated to attract the electromagnetic head slider 30 toward the electromagnetic disk 44.

Thus, the electromagnetic head slider 30 is floating at a height at which the floating force and the attraction force (including not only the floating and attraction force due to the air flow, but also a spring pressure of the gimbal spring 31) are balanced with each other.

It should be understood by those skilled in the art that the foregoing description relates to only a preferred embodiment of the disclosed invention, and that various changes and modifications may be made to the invention without departing from the spirit and scope thereof.

We claim:

1. An air-bearing electromagnetic head slider for supporting an electromagnetic transducer opposed to a rotating recording medium, said slider comprising:

a slider body having a bottom surface opposed to said rotating recording medium, said bottom surface having an air-entry end and an air-delivery end, as defined by an air flow generated between said slider body and said rotating recording medium, said bottom surface also having two outer side edges between said air-entry end and said air-delivery end;

a first rail provided on said bottom surface of the slider body at said air-entry end, said first rail being generally centered on said air-entry end and defining a pair of lateral edges which substantially extend from said air-entry end to a first termination point located before said air-delivery end;

two second rails provided on said surface of the slider body at the air-delivery end and positioned on opposite sides of said first rail between said lateral edges of said first rail and said outer side edges of said slider body, each of said second rails substantially extending from said air-delivery end to a second rail termination point located before said air-entry end wherein each of said second rail termination points is located between said air-entry end and said first termination point;

an air passage, extending from said air-entry end to said air-delivery end, including air inlet gaps defined between said lateral edges of said first rail and said second rails, and a downstream area on said bottom surface located downstream of said air inlet gaps, so that a negative pressure is generated in said downstream area due to air flow passing through said air inlet gaps.

2. A head slider as set forth in claim 1, wherein said two second rails are substantially parallel to each other and a width of each said second rail is gradually enlarged in the vicinity of said air-delivery end.

3. A head slider as set forth in claim 1, wherein said first rail is provided with a tapered portion adjacent said air-entry end for removing dust.

4. A head slider as set forth in claim 1, wherein each of said second rails is provided with a chamfered portion along a direction of air flow, said chamfered portions being adjacent said outer side edges.

5. A head slider as set forth in claim 1, wherein each of said second rails is provided at inside and outside edges thereof with respective chamfered portions along a direction of air flow.

6. A head slider as set forth in claim 1, wherein at least one of said two second rails is provided at an air-delivery end thereof with an electromagnetic transducer and wherein said second rail provided with said electromagnetic transducer is constructed in such a manner that a floating height of said one second rail, at the air-delivery end thereof, with respect to said rotating magnetic disk, is always less than a floating height of the other second rail, at the air-delivery end thereof.

7. A head slider as set forth in claim 6, wherein:
a width of one of said second rails is different from a width of the other second rail, so that said slider body is subjected to a rolling function with respect to a direction of movement of said electromagnetic transducer.

8. A head slider as set forth in claim 6, wherein:
a thickness of one of said second rails is different from a thickness of the other second rail.

* * * * *